United States Patent [19]
Trexler

[11] 3,968,288
[45] July 6, 1976

[54] METHOD OF PRODUCING EMBOSSED, TWO-COLORED SURFACE ON FIBROUS BOARD PRODUCT AND PRODUCT PRODUCED THEREBY

[75] Inventor: Robert F. Trexler, Lancaster, Pa.

[73] Assignee: Armstrong Cork Company, Lancaster, Pa.

[22] Filed: Oct. 16, 1974

[21] Appl. No.: 515,324

[52] U.S. Cl. .......... 428/161; 428/168; 428/172; 428/297; 428/304; 428/327; 427/194; 427/195; 427/198; 427/202

[51] Int. Cl.[2] .......... B32B 3/30; B05D 5/06

[58] Field of Search .......... 117/9, 29, 21, 10, 8; 427/198, 264, 194, 195, 202, 270, 276; 428/161, 168, 172, 297, 304, 327

[56] References Cited

UNITED STATES PATENTS

| | | | |
|---|---|---|---|
| 2,288,860 | 7/1942 | Wallace et al. | 117/9 |
| 2,416,721 | 3/1947 | Upson | 117/65.2 |
| 2,803,188 | 8/1957 | Duvall | 101/32 |
| 3,167,442 | 1/1965 | Brooks | 117/10 X |
| 3,199,923 | 8/1965 | Brooks | 117/21 X |
| 3,207,617 | 9/1965 | Baker | 117/9 |
| 3,208,868 | 9/1965 | Strobel et al. | 117/21 X |
| 3,310,431 | 3/1967 | Loose | 117/21 X |
| 3,325,302 | 6/1967 | Hosfeld | 117/10 |
| 3,384,610 | 5/1968 | Lee | 117/21 X |
| 3,603,288 | 9/1971 | Case et al. | 118/620 |
| 3,682,738 | 8/1972 | Smith | 117/21 X |
| 3,788,872 | 1/1974 | Sigmon, Jr. | 117/10 |

*Primary Examiner*—Harry J. Gwinnell
*Assistant Examiner*—Evan K. Lawrence

[57] ABSTRACT

A method for producing an embossed, two-color appearance on the surface of a fibrous board substrate. The surface of a fibrous board substrate having a uniform thickness is first coated with a prime coating having a first color. A thermosetting resin base powder having a color different from that of the prime coating color is applied over the prime coating. The coated and powdered surface of the substrate is then embossed with a heated embossing device having high and low areas which produce low and high areas respectively on the surface of the substrate. The heat from the embossing roll causes the powder to melt, set, and become concentrated on the high areas of the surface of the substrate leaving only the prime coating remaining in the low areas of the substrate. The embossing device is then removed from the surface of the substrate which now has a two-color appearance, the high areas having the color of the powder and the low areas having the color of the prime coating. The invention also includes the product produced by this process.

10 Claims, 2 Drawing Figures

FIG. 1
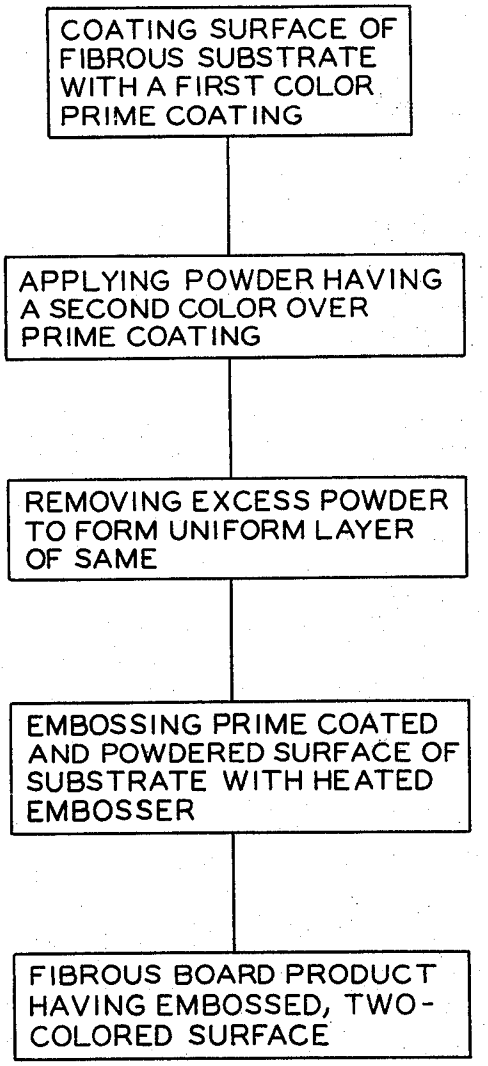
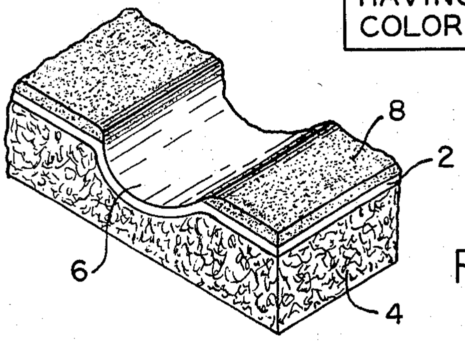
FIG. 2

METHOD OF PRODUCING EMBOSSED, TWO-COLORED SURFACE ON FIBROUS BOARD PRODUCT AND PRODUCT PRODUCED THEREBY

BACKGROUND OF THE INVENTION

1. Field of the Invention

This invention pertains to a method for decorating the surface of a fibrous board substrate and the product produced by this method. More particularly, this invention relates to a method of producing a fibrous board substrate having an embossed, two-colored surface and the product produced using this method.

2. Description of the Prior Art

U.S. Pat. No. 3,325,302 discloses the coating of a fibrous board on it top and bottom surfaces with a casein-clay primer prior to embossing of the fibrous board. This patent teaches the use of the casein-clay primer to penetrate and soften the surface of the fibrous board to improve the detail of the subsequent embossing.

U.S. Pat. No. 2,803,188 discloses a method of enhancing the decorative character of a coated cellulosic fiberboard by embossing the surface of the coated board.

U.S. Pat. No. 2,416,721 discloses coating one or both surfaces of a web or board with a thermosetting resin. The resin coated surface or surfaces is then ironed to produce a smooth and glossy surface or surfaces.

U.S. Pat. No. 3,603,288 shows a process for obtaining a plastic coating on metallic wire or flat sheets by first prime coating the metallic article, then applying fusible plastic powder to the prime coating on the article, and then fusing said powder to said coating.

The above prior art patents are void of any teachings which suggest twice coating and subsequently embossing the surface of a fibrous board substrate to achieve an embossed and two-colored appearance on such surface.

SUMMARY OF THE INVENTION

This invention relates to a method for producing an embossed and two-colored appearance on the surface of a fibrous board substrate having a uniform thickness. The surface of the fibrous board substrate is first coated with a prime coating having any desired first color. A thermosetting resin base powder having any desired color different from the color of the prime coating is then applied over the prime coated surface of the fibrous board substrate. The coated and powdered surface of the fibrous board substrate is then embossed by pressing a heated embossing device into the coated and powdered surface of said substrate. The embossing device which has high and low areas on its surface produces low and high areas respectively on the surface of said substrate. The embossing device is heated to a temperature high enough so that the powder melts, sets, and becomes concentrated on the high areas of the surface of said substrate leaving only the prime coating remaining in the low areas of the surface of said substrate. The embossing device is then removed from the surface of said substrate. The resulting product produced by this method has an embossed surface having a two-color appearance. The low areas of the surface have the color of the prime coating and the high areas of the surface have the color of the thermosetting resin base powder. The product made by the just described method is also a part of this invention.

BRIEF DESCRIPTION OF THE DRAWING

FIG. 1 is a flow diagram of the preferred method of the present invention. The legends on all figures are self-explanatory.

FIG. 2 is a perspective view of a board made by the method herein.

DESCRIPTION OF THE PREFERRED EMBODIMENT

The starting point for the method of this invention which is aimed at achieving an embossed and two-colored appearance on the surface of a fibrous board substrate is a fibrous board substrate manufactured by any known board forming processes. The fibrous board substrate may be manufactured basically from wood fibers or basically from mineral fibers, or basically from any combination of wood and mineral fibers. Also, said substrate should have a uniform thickness which can be achieved by sanding one or both surfaces of said board or by any other conventional board surfacing methods which would achieve a board substrate of uniform thickness or by any board forming process which would control the thickness of the board to a uniform thickness.

The first step in the method of this invention is roll coating a water soluble casein-clay prime coating 2 on the surface of the fibrous board substrate 4. The prime coating may also be applied by spraying or by any other conventional means for applying a coating to a board substrate. The roll coating step is preferably carried out with a tinted or colored prime coating; however, any color prime coating may be used so long as it is different in color from the subsequently applied thermosetting epoxide base powder. Also, it is preferred that said prime coating being roll coated on the surface of said substrate has from 40 to 60% solids and is roll coated at a rate in the range of from 13 grams per square foot (139.78 grams per square meter) to 18 grams per square foot (193.55 grams per square meter) on a wet basis. Although the water soluble casein-clay prime coating is preferred, other prime coatings which are water soluble, e.g., polyvinyl alcohol, soya protein, may also be used effectivaly.

The criteria to be used in determining the coating rate of the prime coating are several. For the lower limit of the coating rate, there are two criteria. First, the coating rate must be great enough to adequately cover the surface of the said substrate. Secondly, since the prime coating because of its wetness acts as an adhesive for the subsequently applied powder, the coating rate must be great enough to give adequate adhesion for the powder to the substrate. For the upper limit of the coating rate, there are also two criteria. First, the coating rate cannot be so great that too much prime coating is applied and, therefore, cannot be dried. Secondly, the coating rate must not be so great that the prime coating will pick off or be taken off of the substrate surface when it is subsequently being dried and embossed with a heated embossing roll.

After said prime coating has been roll coated onto the surface of said substrate, a thermosetting epoxide base powder is applied over said prime coating with a curtain coater. Any other conventional device for applying a layer of powder of uniform gauge onto a moving fibrous board substrate could also be used in this application step. Then, any excess powder applied over said prime coating is removed by an conventional vacuum device so that there is now a uniform layer of said powder over said prime coating.

Since in the embodiment being described it is preferred to have a tinted or colored prime coating, it is correspondingly preferred to have a white epoxide base powder. Specifically, a suitable white, thermosetting epoxide base powder is Virkotype Seafoam White having a particle size in the range of 30 to 60 mesh, made by Virkotype Division of Lauwter Chemicals, Inc. Plainfield, N.J. When this Virkotype Seafoam White expoxide base powder having particle sizes in the range of 30 to 60 mesh is used, the application rate is in the range of from 20 grams per square foot (215.05 grams per square meter) to 25 grams per square foot (268.82 grams per square meter) on a dry basis.

Although this preferred embodiment of the method of this invention has been described in terms of a thermosetting epoxide base powder, any thermosetting resin base powder which has a similar melting point range can be used in this method. Also, it should be noted that particle sizes for the powder used need not be in the range of from 30 to 60 mesh. Both finer and coarser particle sizes for the powder may be used satisfactorily. The only difference is that the appearance of the final product will vary depending on the particle sizes used for the powder.

Concerning the step of applying the powder over said prime coating, two criteria must be met to have proper application of this powder. First, the rate of application of this powder must be great enough so that there is full coverage of said powder over said prime coating. Secondly, said powder must be applied so that the thickness of the powder layer is as uniform as possible.

The surface of the fibrous board substrate which has been prime coated with a colored prime coating and has had a white thermosetting epoxide base powder applied over said prime coating is then embossed using a heated rotary embossing roll. The rotary embossing roll has high areas, ridges, and low areas, valleys, which produce low areas, valleys, and high areas, ridges, respectively, on the surface of said substrate. Using the said prime coating and the said Virkotype Seafoam White epoxide base powder described in this preferred method, said embossing roll is heated to a temperature in the range of 950° (510°C) to 1300°F (704.4°C) so that said prime coating dries and said powder melts, sets, and becomes concentrated on the high areas, ridges, of the surface of said substrate. The line speed of the line on which said substrate is moving as it proceeds through said embosssing roll is in the range of from 100 feet per minute (30.47 meters per minute) to 120 feet per minute (36.56 meters per minute). The temperature range of said embossing roll and the line speed must be coordinated so that neither too much heat nor too little heat is applied to the surface of said substrate as it is being embossed. For if the temperature is too high and/or the line speed too low, said powder may be scorched with a resultant unusable product. If the temperature is too low and/or the line speed too high, the melted power may adhere to the embossing roll rather than said substrate and again a resulting unusable product is obtained.

After proceeding through said embossing roll, said substrate emerges with a decorative surface having an embossed and two-color appearance. The high areas, ridges, have concentrated thereon the melted and set white epoxide powder. The low areas, valleys 6, have no melted and set white epoxide powder therein since all of said powder covering the areas which are now occupied by these low areas, valleys, has now become concentrated on the high areas, ridges 8, of the surface of said substrate. However, the tinted or colored prime coating still remains in these low areas, valleys, therefore, the resulting fibrous board substrate has an embossed surface with white melted and set powder on the high areas, ridges, and tinted or colored dried prime coating in the low areas, valleys. Hence, the method of this invention produces a fibrous board product having an embossed, two-color appearance on the surface thereof with the colors being in exact register with the embossing. This product is also a part of this invention.

What is claimed is:

1. A method for producing an embossed, two-color appearance on the surface of a fibrous board substrate having a uniform thickness comprising the steps of coating the surface of the fibrous board substrate with an aquesus dispersion of a prime coating of a first color, applying a thermosetting resin base powder over the prime coated surface of said substrate while the prime coating is wet, said powder having a second color which is different from the color of said prime coating, embossing the coated and powdered surface of said substrate by pressing a heated embossing device into the coated and powdered surface of said substrate, said embossing device having high and low areas which produce low and high areas respectively on said surface of said substrate and being heated to a temperature such that said prime coating dries and said powder melts, sets, and becomes concentrated on the high areas of said surface of said substrate leaving only the prime coating remaining in the low areas of said surface of said substrate, and then removing said embossing device from said surface of said substrate whereby said embossed surface has a two-color appearance with the low areas having the first color and the high areas having the second color.

2. The method of claim 1 wherein the step of coating the surface of the fibrous board substrate with said prime coating is accomplished by spraying.

3. The method of claim 1 wherein the step of coating the surface of the fibrous board substrate with said prime coating is accomplished by roll coating.

4. The method of claim 3 wherein the roll coating step comprises roll coating with a water soluble casein-clay prime coating of from 40–60% solids at a coating rate in the range of 13 grams per square foot (139.78 grams per square meter) to 18 grams per square foot (193.55 grams per square meter) on a wet basis.

5. The method of claim 1 wherein the step of applying said powder over said prime coating is accomplished by curtain coating.

6. The method of claim 5 comprising the additional step of removing any excess thermosetting resin base powder after said powder has been applied over said prime coating so that there is a uniform layer of said powder over said prime coating before said fibrous board substrate is embossed.

7. The method of claim 6 wherein the thermosetting resin base powder comprises a thermosetting epoxide base powder.

8. The method of claim 7 wherein the embossing device is heated to a temperature in the range of 950°F (510°C) to 1300°F (704.4°C).

9. The method of claim 1 wherein the step of embossing the coated and powdered surface of said substrate is accomplished by using a rotary embossing roll.

10. The product produced by the method of claim 1.

* * * * *